United States Patent
Natarahjan et al.

(10) Patent No.: US 9,420,450 B2
(45) Date of Patent: Aug. 16, 2016

(54) METHODS AND SYSTEMS FOR TALKGROUP-STATE-DEPENDENT ROUTING OF GROUP DATA

(71) Applicant: MOTOROLA SOLUTIONS, INC, Schaumburg, IL (US)

(72) Inventors: Harish Natarahjan, Streamwood, IL (US); Anuj Kapoor, Palatine, IL (US); Daniel J McDonald, Cary, IL (US); Michael C Petrie, Hoffman Estates, IL (US)

(73) Assignee: MOTOROLA SOLUTIONS, INC., Schaumburg, IL (US)

( * ) Notice: Subject to any disclaimer, the term of this patent is extended or adjusted under 35 U.S.C. 154(b) by 150 days.

(21) Appl. No.: 14/470,062

(22) Filed: Aug. 27, 2014

(65) Prior Publication Data

US 2016/0066177 A1    Mar. 3, 2016

(51) Int. Cl.
*H04W 8/18* (2009.01)
*H04L 12/18* (2006.01)
*H04W 76/00* (2009.01)

(52) U.S. Cl.
CPC ............. *H04W 8/186* (2013.01); *H04L 12/189* (2013.01); *H04W 76/005* (2013.01)

(58) Field of Classification Search
None
See application file for complete search history.

(56) References Cited

U.S. PATENT DOCUMENTS

| | | | |
|---|---|---|---|
| 4,831,373 A | 5/1989 | Hess | |
| 4,837,858 A | 6/1989 | Ablay et al. | |
| 5,420,574 A | 5/1995 | Erickson et al. | |
| 5,442,809 A | 8/1995 | Diaz et al. | |
| 7,346,342 B2 | 3/2008 | Kirbas | |
| 7,483,418 B2 | 1/2009 | Maurer | |
| 8,135,362 B2 | 3/2012 | Ladue | |
| 8,335,530 B2 | 12/2012 | Chaudry et al. | |
| 8,391,829 B2 | 3/2013 | Das | |
| 2003/0232629 A1 | 12/2003 | Jang et al. | |
| 2005/0073972 A1 | 4/2005 | Hasegawa | |
| 2006/0146702 A1* | 7/2006 | Hart | H04L 45/00 370/229 |
| 2006/0193448 A1 | 8/2006 | Donoghue et al. | |
| 2009/0116445 A1* | 5/2009 | Samar | H04W 36/02 370/331 |
| 2010/0190518 A1* | 7/2010 | Lindner | H04W 4/10 455/518 |
| 2015/0109965 A1* | 4/2015 | Ayyalasomayajula | H04W 4/22 370/259 |

FOREIGN PATENT DOCUMENTS

WO      2012064495 A1    5/2012

* cited by examiner

*Primary Examiner* — Ayaz Sheikh
*Assistant Examiner* — Peter Chau

(57) ABSTRACT

Disclosed herein are methods and systems for talkgroup-state-dependent routing of group data. An embodiment takes the form of a process that includes handling receipt of packet data addressed to a talkgroup by responsively: determining whether the talkgroup currently has an active voice session on a voice channel; if not, then routing the received packet data to the talkgroup on a data channel; and if so, then routing the received packet data to the talkgroup via metadata fields in the voice channel.

19 Claims, 7 Drawing Sheets

METHODS AND SYSTEMS FOR TALKGROUP-STATE-DEPENDENT ROUTING OF GROUP DATA

BACKGROUND OF THE INVENTION

Mobile radios, such as cell phones, smartphones, and WiFi hotspots, are generally configured with the ability to obtain one or more types of wireless service. Indeed, mobile radios are often configured to be able to obtain voice service and/or data service from one or more radio access networks (RANs). In general, wireless communications that are sent from a RAN to a mobile radio are referred to as "downlink" communications, while wireless communications that are sent from a mobile radio to the RAN are referred to as "uplink" communications. Further, a respective type of communication is typically routed over a respective type of channel. For example, voice communication is generally routed over a voice channel, while packet-data communication is generally routed over a data channel.

Some wireless networks allow for multiple mobile radios to engage in a given communication session. As examples, it is often the case that downlink voice communications and downlink data communications can be addressed to multiple mobile radios as a set that is often referred to as a "talkgroup." Moreover, some mobile radios are only able to communicate over one channel at any given time. Accordingly, there is a need for methods and systems for talkgroup-state-dependent routing of group data.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
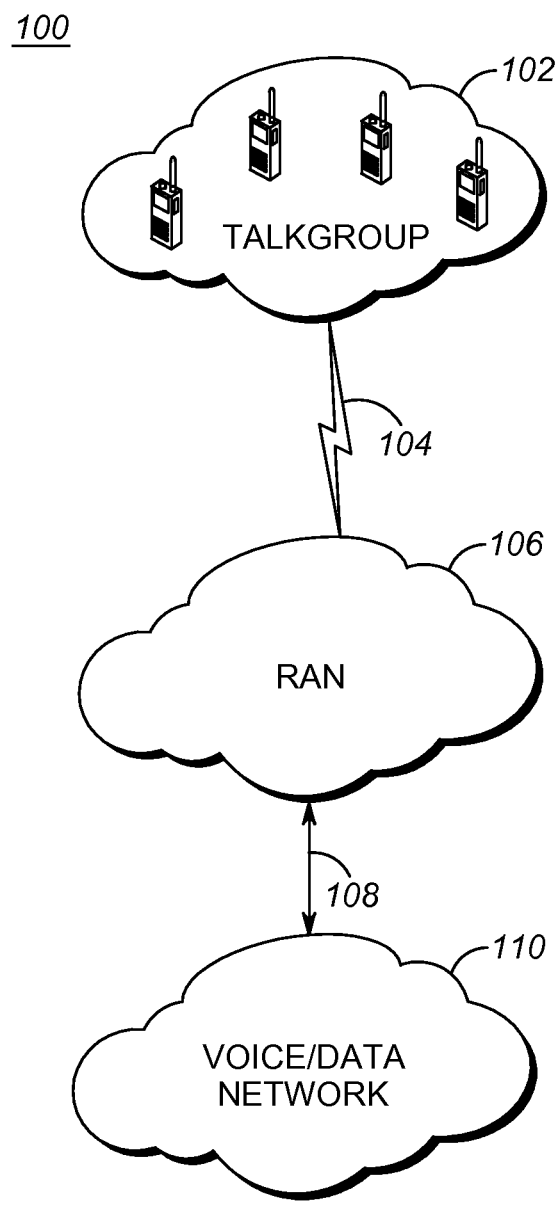
FIG. 1 depicts an example communication system, in accordance with at least one embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and systems for talkgroup-state-dependent routing of group data. One embodiment takes the form of a process that includes handling receipt of packet data addressed to a talkgroup by responsively: determining whether the talkgroup currently has an active voice session on a voice channel; if not, routing the received packet data to the talkgroup on a data channel; and if so, routing the received packet data to the talkgroup via metadata fields in the voice channel.

Another embodiment takes the form of a system that includes a communication interface, a processor, and data storage containing instructions executable by the processor for causing the system to carry out a set of functions that includes at least the functions described in the preceding paragraph. Moreover, any of the variations and permutations described in the ensuing paragraphs and anywhere else in this disclosure can be implemented with respect to any embodiments, including with respect to any method embodiments and any system embodiments.

In at least one embodiment, the talkgroup has an active voice session on a given voice channel while the given voice channel is allocated to the talkgroup for the active voice session.

In at least one embodiment, the talkgroup has an active voice session on a given voice channel when one or more of the following is true: (i) audio data is being transmitted on the given voice channel in connection with the active voice session, (ii) signaling data is being transmitted on the given voice channel in connection with the active voice session, and (iii) the active voice session is in a hang-time state.

At least one embodiment includes continuing a transfer of the packet data to the talkgroup on a voice channel responsive to detecting an early termination of the transfer of the packet data to the talkgroup on the data channel.

At least one embodiment includes completing a transfer of the packet data via the metadata fields in the voice channel during the voice session.

At least one embodiment includes continuing a transfer of the packet data on the voice channel subsequent to detecting a termination of the voice session.

At least one embodiment includes continuing a transfer of the packet data on a data channel responsive to detecting a termination of the voice session.

In at least one embodiment, one or more of the herein-described functions are carried out in response to determining that the packet data consists of less than a threshold amount of packet data.

At least one embodiment includes handling receipt of voice-session requests for the talkgroup by responsively: determining whether the talkgroup currently has an active data session on a data channel; if not, then establishing the requested voice session on a voice channel; and if so, then (i) establishing the requested voice session on a voice channel and (ii) continuing the active data session via metadata fields in the voice channel on which the requested voice session was established.

In at least one embodiment, the talkgroup has an active data session on a given data channel while the given data channel is allocated to the talkgroup for the active data session.

In at least one embodiment, the talkgroup has an active data session on a given data channel when one or more of the following is true: (i) bearer data is being transmitted on the given data channel in connection with the active data session, (ii) signaling data is being transmitted on the given data channel in connection with the active data session, and (iii) the active data session is in a not-timed-out state.

In at least one embodiment, the data session is completed via metadata fields in the voice channel during the requested voice session.

At least one embodiment includes continuing the active data session on the voice channel subsequent to detecting a termination of the voice session.

At least one embodiment includes continuing the active data session on a data channel responsive to detecting a termination of the voice session.

In at least one embodiment, the data channels are group data channels that are not specifically allocated to particular talkgroups at particular times.

In at least one embodiment, the data channels are specifically allocated to particular talkgroups at particular times.

In at least one embodiment, the metadata fields are link-control (LC) fields.

In at least one embodiment, the metadata fields are Media Access Control (MAC) layer fields.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . ." And it is for reasons akin to brevity and clarity of presentation that this implied leading clause is not repeated ad nauseum in this detailed description.

FIG. 1 depicts an example communication system, in accordance with at least one embodiment. In particular, FIG. 1 depicts an example communication system 100 that includes a talkgroup 102 that communicates over an air interface 104 with a RAN 106, which is communicatively connected by way of a communication link 108 with a voice/data network 110.

The talkgroup 102 is depicted as including four mobile radios, though this is by way of example, as the talkgroup 102 can contain any number of mobile radios. Moreover, the mobile radios in the talkgroup 102 may be any suitable computing and communication devices configured to engage in wireless communication with the RAN 106 over the air interface 104 as is known to those in the relevant art. Some example mobile radios and wireless-communication links are discussed below in connection with the various figures.

The talkgroup 102 and the RAN 106 may communicate over the air interface 104 using one or more wireless-communication types, according to one or wireless-communication protocols, as is known by those having skill in the relevant art. What follows is a non-exhaustive list of example wireless-communication types and/or protocols, one or more of which could be used in a given implementation: time-division multiple access (TDMA), code-division multiple access (CDMA), frequency-division multiple access (FDMA), orthogonal frequency division multiple access (OFDMA), land mobile radio (LMR), digital mobile radio (DMR), Long Term Evolution (LTE), WiFi, Association of Public-Safety Communications Officials-International (APCO) Project 25 (P25), and Terrestrial Trunked Radio (TETRA), though certainly numerous other examples could be listed.

An example RAN 106 is discussed below in connection with FIG. 2, though in general, the RAN 106 includes typical RAN elements such as base stations, base station controllers, routers, switches, and the like, arranged, connected, and programmed to provide wireless service to, e.g., the mobile radios in the talkgroup 102 in a manner that in general is known to those of skill in the relevant art. The talkgroup 102 and the RAN 106 may communicate via the air interface 104 on one or more downlink channels, one or more uplink channels, one or more voice channels, one or more data channels, and/or one or more channels of any other type deemed suitable by those of skill in the relevant art in a given context. Moreover, the RAN 106 may address downlink communications to a single mobile radio using an identifier uniquely associated with that mobile radio (e.g., a Subscriber Unit Identifier (SUID)) and/or to multiple mobile radios (e.g., the mobile radios in a talkgroup) using an identifier that is associated with those multiple mobile radios as a group (e.g., a Subscriber Group ID (SGID)).

The voice/data network 110 may include one or more data networks and/or one or more voice networks. In embodiments in which the voice/data network 110 includes one or more data networks, one or more of such data networks may carry data calls, sessions, signaling, and the like using one or more packet-switching protocols such as the Internet Protocol (IP), and may be connected directly or indirectly to the global network of networks typically referred to as the Internet. In embodiments in which the voice/data network 110 includes one or more voice networks, one or more of such voice networks may carry voice data, calls, sessions, signaling, and the like using one or more circuit-switched protocols and/or one or more packet-switched protocols, and may be connected to one or more plain old telephone system (POTS) networks, such as the public switched telephone network (PSTN). The voice/data network 110 may include one or more other RANs and one or more other base stations, as but two illustrative examples. Moreover, the voice/data network 110 may include one or more network access servers (NASs), gateways, and the like for bridging communications to one or more other entities and/or networks. In at least one embodiment, the voice/data network includes or is connected—via one or more packet-switched connections and/or one or more circuit-switched connections—with a public-safety dispatcher. In at least one embodiment, the RAN 106 includes a public-safety dispatcher. Moreover, the communication link 108, as is the case with any of the communication links described herein, could make use of wired and/or wireless forms of communication. And one or more other communication links—in addition to and/or instead of those depicted and described—could be present in any of the described embodiments, as known to those having skill in the relevant art.

Figure 2:
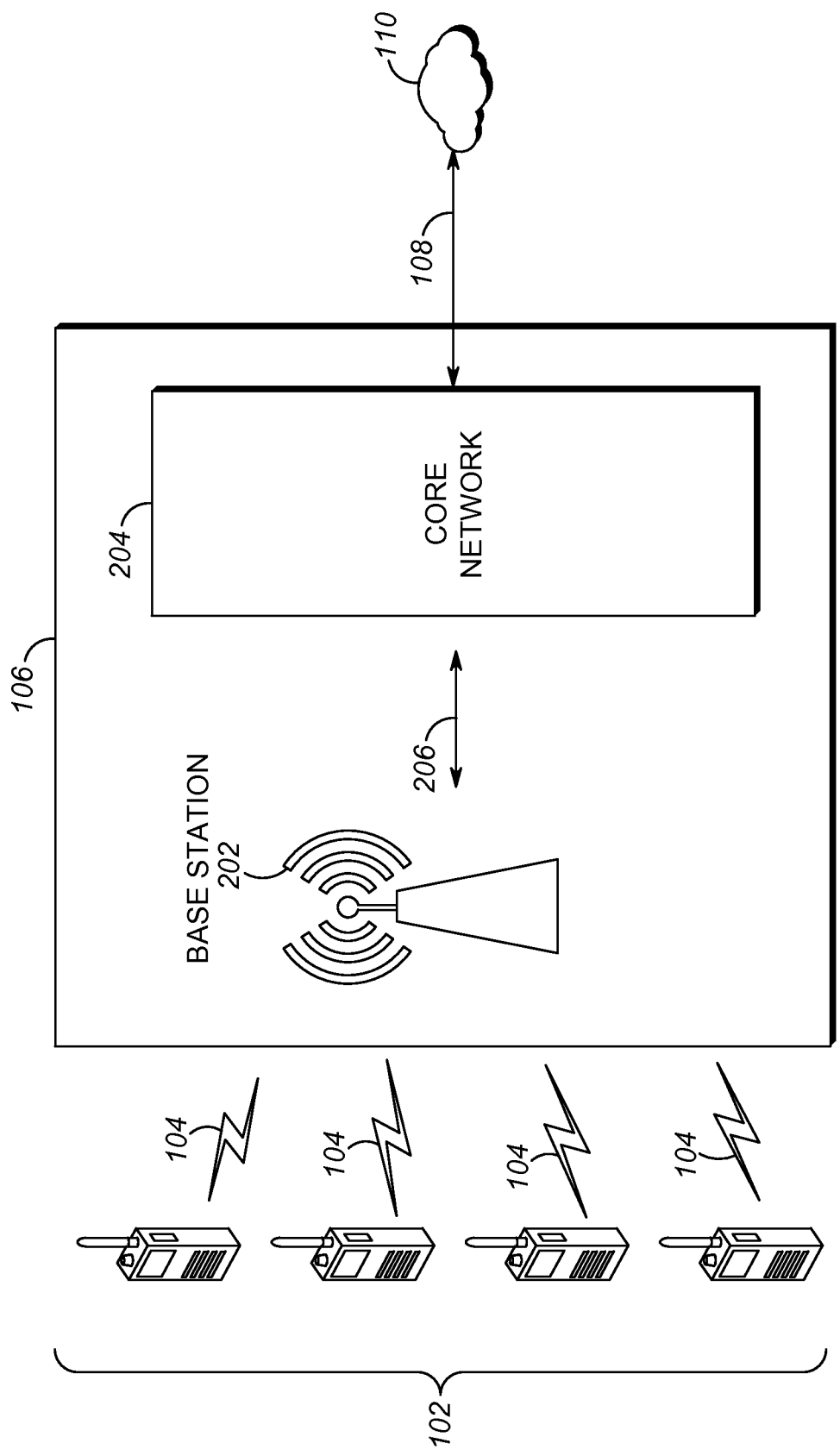
FIG. 2 depicts a further example of the communication system of FIG. 1, in accordance with at least one embodiment.

FIG. 2 depicts a further example of the communication system of FIG. 1, in accordance with at least one embodiment. FIG. 2 depicts the communication system 100 of FIG. 1, though in more detail regarding some example mobile radios in the talkgroup 102 and an example RAN 106. In particular, FIG. 2 depicts the RAN 106 as including a base station 202 and a core network 204 that communicate with one another over a communication link 206. It is noted that this depiction of the example RAN 106 is purely by way of example and not limitation, as other entities and/or other arrangements may be selected by those having skill in the relevant art.

In at least one embodiment, the base station 202 includes the hardware and software (and/or firmware) to facilitate base station 202 engaging, on one side (i.e., the wireless-network side (interface)), in communications over the air interface 104 with one or more of the mobile radios in the talkgroup 102 and engaging, on the other side (i.e., the "backhaul" side), in communications with the core network 204 via the communication link 206, to facilitate communications between various of the mobile radios in the talkgroup 102 and networks such as the example RAN 106 and the example voice/data network 110. Also, while one base station 202 is depicted by way of example in FIG. 2, any suitable number of base stations could be deployed as deemed suitable by those of skill in the relevant art.

The core network 204 may include one or more network entities such as computers, servers, gateways, and the like for carrying out functions such as mobility management, registration, authentication, talkgroup management, and the like. These entities may be configured and interconnected in a manner known to those of skill in the relevant art to provide wireless service to the mobile radios in the talkgroup 102 via the base station 202, and to bridge such wireless service with various transport networks such as the example voice/data network 110 as an example.

Figure 3:
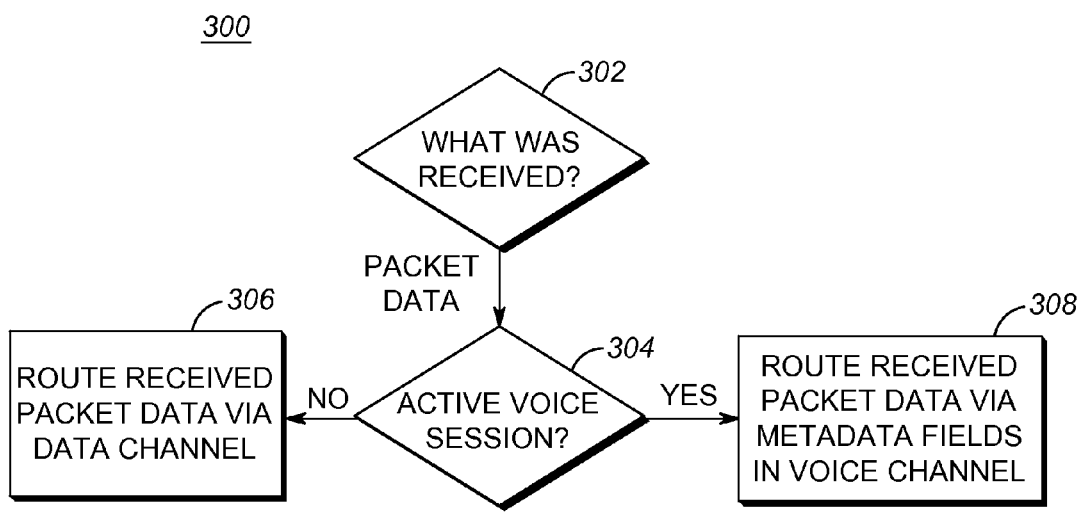
FIG. 3 depicts a first example process, in accordance with at least one embodiment.

FIG. 3 depicts a first example process, in accordance with at least one embodiment. In particular, FIG. 3 depicts a process 300 that is described herein as being carried out by a base station such as the base station 202. The description of the process 300 as being carried out by a base station is provided by way of example, as other suitably equipped and programmed devices (or systems that include one or more such devices) could carry out the process 300, as known to those in the art.

The process 300 begins with an assumption that a base station has received some information (e.g., data, messaging, signaling, and/or the like) from one or more transmitting systems, some examples of which include computers, servers, mobile devices, packet data gateways (PDGs), and/or the like.

At step 302, the base station determines what type of information has been received. If the base station determines at step 302 that what was received is packet data addressed to a talkgroup (e.g., the talkgroup 102), then processing proceeds to step 304, where the base station determines whether the talkgroup currently has an active voice session on a voice channel.

In at least one embodiment, the base station determines whether the talkgroup has an active voice session on a voice channel at least in part by determining whether a voice channel is currently allocated to the talkgroup for a voice session. In at least one embodiment, the base station determines whether the talkgroup has an active voice session on a voice channel at least in part by determining whether one or more of the following is true: (i) audio data is being transmitted on a given voice channel in connection with an active voice session, (ii) signaling data is being transmitted on the given voice channel in connection with the active voice session, and (iii) the active voice session is in a hang-time state (i.e., no current transfer of (e.g., audio and/or signaling) data is ongoing, but the voice session is still considered to be active because a "hang timer" or the like has not yet expired, where such a hang timer gets reset at the end of each transfer of voice data and/or signaling data, depending on the particular implementation, as known to those in the art). And certainly one or more other ways of determining whether a talkgroup has an active voice session on a voice channel could be utilized by those of skill in the relevant art.

If the base station determines at step 304 that the talkgroup does not currently have an active voice session on a voice channel, then, at step 306, the base station routes the received packet data to the talkgroup on a data channel. In at least one such embodiment, the base station detects an early termination of the transfer of the packet data to the talkgroup on the data channel, and responsively continues the transfer of the packet data to the talkgroup on a voice channel. In that example and in any other example that is described herein in which the talkgroup is switched from a voice channel to a data channel or vice versa, the base station may engage in signaling with the talkgroup to direct the mobile radios in that talkgroup to accordingly tune to a different channel, perhaps among one or more other instructions. Those of skill in the relevant art are familiar with such signaling directives to talkgroups.

If, however, the base station determines at step 304 that the talkgroup does currently have an active voice session on a voice channel, then, at step 308, the base station routes the received packet data to the talkgroup via metadata fields in the voice channel. In this and other embodiments that involve the transfer of packet data and/or the conducting of a data session via metadata fields in a voice channel, those metadata fields could be LC fields, perhaps in embodiments in which the voice channels operate according to FDMA. As another example, the metadata fields could be MAC layer fields, perhaps in embodiments in which the voice channels operate according to TDMA. And certainly other types of voice-channel metadata fields could be utilized in connection with various different embodiments, as deemed suitable by those having skill in the relevant art in a given context or for a given implementation.

In examples in which step 306 has been carried out, and in which the base station thereafter (though during the established data session in which the packet data is being transferred to the talkgroup via a data channel) receives a voice-session request for the talkgroup, are accounted for by the below-described process 400.

In examples in which step 308 has been carried out, various possible scenarios could be encountered depending on whether or not the transfer of the packet data is completed by the base station via metadata fields in the voice channel during the voice session. In at least one embodiment, the base station completes the transfer of the packet data via the metadata fields in the voice channel during the voice session. Moreover, at least one embodiment, the hang time is extended (e.g., the hang timer is increased) dynamically based at least in part on the amount of data that still remains to be transmitted; for example, if that amount is less than a certain threshold, the transfer may be completed via the voice channel, whereas if that amount is greater than or equal to a certain threshold, the transfer may be moved to a data channel. Thus, at least one embodiment includes continuing the transfer of the packet data on the voice channel subsequent to detecting termination of the voice session, while at least one embodiment includes continuing the transfer of the packet data on a data channel responsive to detecting termination of the voice session. As a general matter, those having skill in the relevant art will recognize the inherent flexibility of the present methods and systems, and may implement other similar examples.

Figure 4:
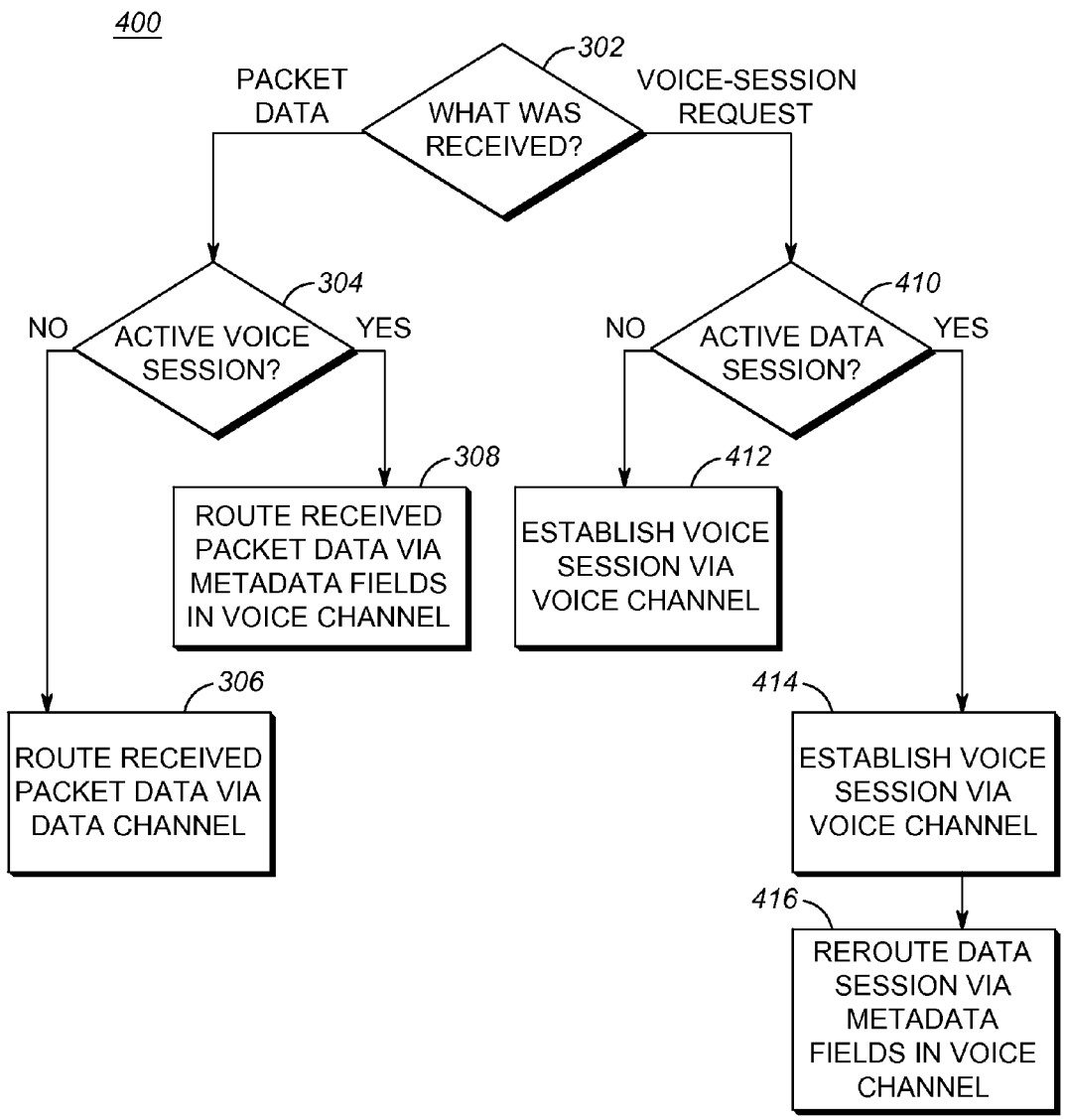
FIG. 4 depicts a second example process, in accordance with at least one embodiment.

FIG. 4 depicts a second example process, in accordance with at least one embodiment. In particular, FIG. 4 depicts an example process 400 that includes the steps 302-308 of the above-described example process 300. In the example process 400, a second possibility for the type of received information is included. As such, in the example process 400, if the base station determines at step 302 that what was received was a voice-session request for the talkgroup, processing proceeds to step 410, where the base station determines whether the talkgroup currently has an active data session on a data channel. In at least one embodiment, the received voice-session request is received from a dispatcher (which is at times referred to using other terms such as dispatch, console, computer-aided dispatcher (CAD), and the like, as is known to those having skill in the relevant art). Moreover, in at least one embodiment, the requested voice session for the talkgroup includes a dispatcher.

In at least one embodiment, the base station determines whether the talkgroup has an active data session on a data channel at least in part by determining whether a data channel is currently allocated to the talkgroup for a data session. In at least one embodiment, the base station determines whether the talkgroup has an active data session on a data channel at least in part by determining whether one or more of the following is true: (i) bearer data is being transmitted on the given data channel in connection with the active data session, (ii) signaling data is being transmitted on the given data channel in connection with the active data session, and (iii) the active data session is in a not-timed-out state (i.e., no current transfer of (e.g., bearer and/or signaling) data is ongoing, but the data session is still considered to be active because a "timeout timer" or the like has not yet expired, where such a timeout timer gets reset at the end of each transfer of bearer data and/or signaling data, depending on the particular implementation, as known to those in the art). And certainly one or more other ways of determining whether a talkgroup has an active data session on a data channel could be utilized by those of skill in the relevant art.

If the base station determines at step 410 that the talkgroup does not currently have an active data session on a data channel, then, at step 412, the base station establishes the requested voice session on a voice channel.

If, however, the base station determines at step 410 that the talkgroup does currently have an active data session on a data channel, then, at step 414, the base station establishes the requested voice session for the talkgroup on a voice channel and, at step 416, continues the active data session for the talkgroup via metadata fields in the voice channel on which the requested voice session was established.

In examples in which step 410 has been carried out, and in which the base station thereafter (though during the established voice session) receives packet data for the talkgroup, are accounted for by the above-described process 300, which is also a subset of the example process 400.

In examples in which steps 414 and 416 have been carried out, various possible scenarios could be encountered depending on whether or not the data session is completed via metadata fields in the voice channel during the requested (and then established) voice session. In at least one embodiment, the base station completes the data session via the metadata fields in the voice channel during the voice session. At least one embodiment includes continuing the active data session on the voice channel subsequent to detecting a termination of the voice session, while at least one embodiment includes continuing the active data session on a data channel responsive to detecting a termination of the voice session.

Moreover, in one example embodiment, the base station conditions the carrying out of one or more of the herein-described functions (e.g., step 308) on the packet data (to be transferred) consisting of less than a threshold amount of packet data. One non-exclusive reason for enforcing such a condition is that the data rates that are attainable via metadata fields in voice channels will often be less than the data rates that are attainable via data channels. If utilized, such a threshold could be configurable on the network side and/or on the user side.

Figure 5:
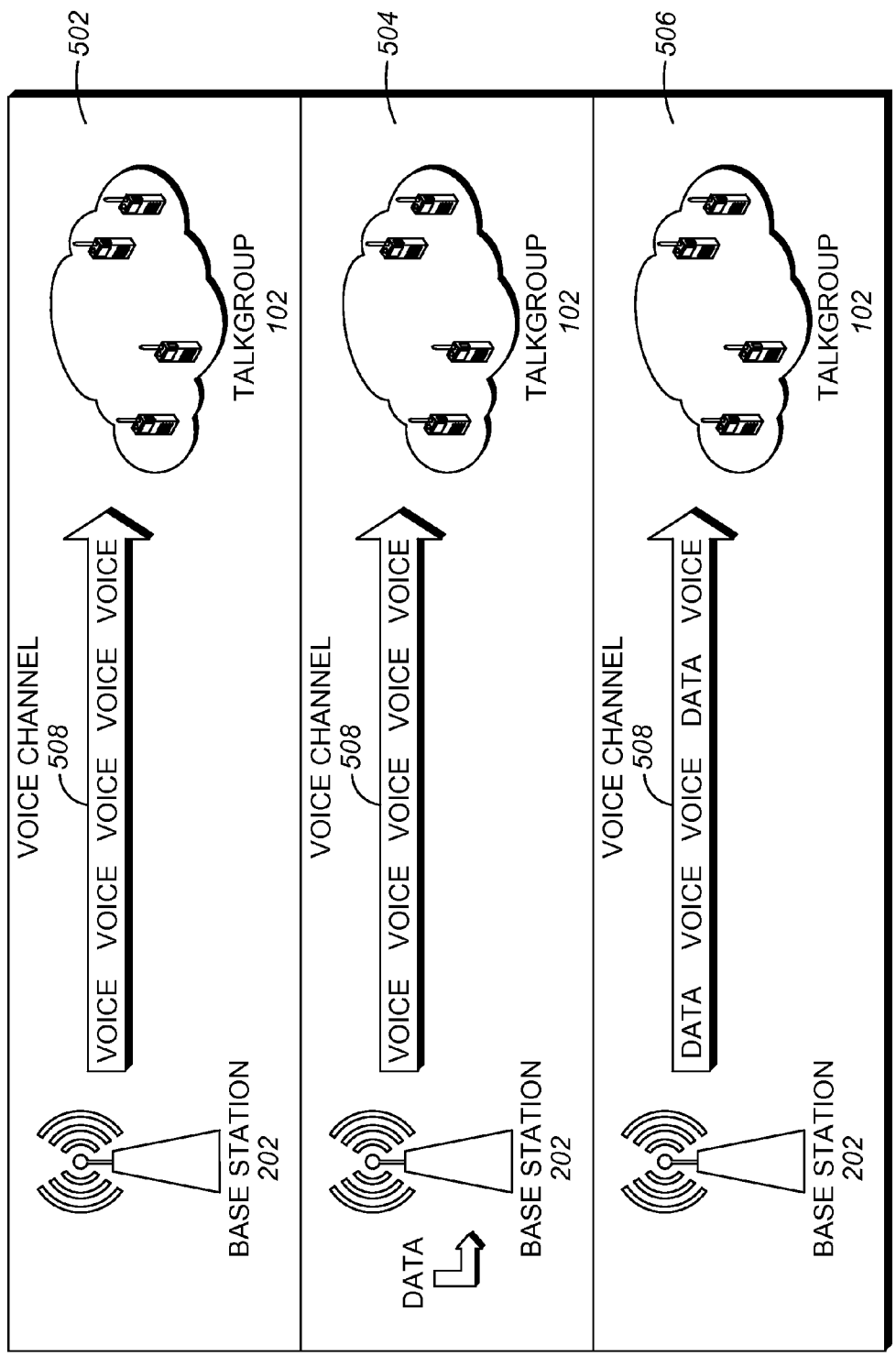
FIG. 5 depicts an example of one or more network entities handling receipt of packet data addressed to a talkgroup, in accordance with at least one embodiment.

FIG. 5 depicts an example of one or more network entities (in this case the example base station 202) handling receipt of packet data addressed to a talkgroup (in this case the talkgroup 102), in accordance with at least one embodiment. Three successive times (i.e., time periods and/or instances) 502, 504, and 506 are depicted in FIG. 5. At time 502, the talkgroup 102 has an active voice session on a voice channel 508, which is depicted as an arrow that is directed from the base station 202 towards the talkgroup 102, while the active voice session is depicted as "VOICE" indicators in the voice channel 508.

At time 504, the base station 202 receives (or has received) packet data addressed to the talkgroup 102, as illustrated by the arrow that is to the left of, and directed towards, the base station 202, and that is depicted just below a "DATA" indicator. In response to receiving the packet data, the base station 202 determines whether or not the talkgroup 102 currently has an active voice session, which the talkgroup 102 does, on the example voice channel 508. At time 506, the base station 202 accordingly routes the received packet data to the talkgroup 102 via metadata fields in the voice channel 508, as illustrated by the combination of "DATA" and "VOICE" indicators in the voice channel 508 during time 506. The "DATA" indicators represent the packet data being transmitted via metadata fields in the voice channel 508, while the "VOICE" indicators represent the active voice session that had already been ongoing when the base station 202 received the packet data for the talkgroup 102 during time 504. And certainly other examples could be presented.

Moreover, if the voice session terminates at a time when a given amount of packet data remains to be routed to the talkgroup 102, the base station 202 may opt to complete the transfer of packet data via metadata fields in the voice channel (and may accordingly extend the voice session based on the amount of remaining packet data), rather than continuing the transfer via a data session on a data channel. And certainly other possibilities could be listed.

Figure 6:
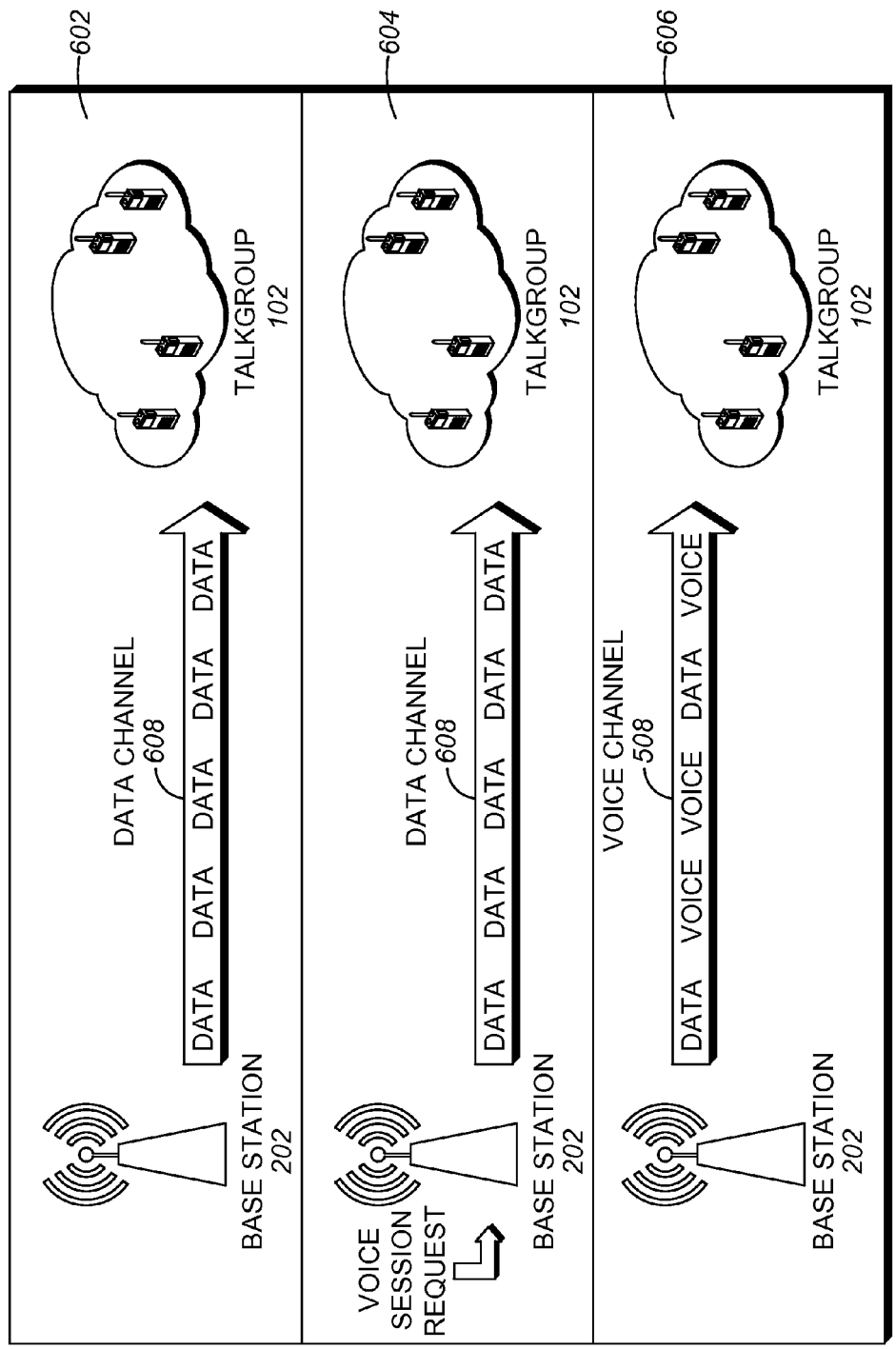
FIG. 6 depicts an example of one or more network entities handling receipt of voice-session requests for a talkgroup, in accordance with at least one embodiment.

FIG. 6 depicts an example of one or more network entities (in this case the example base station 202) handling receipt of voice-session requests for a talkgroup (in this case the talkgroup 102), in accordance with at least one embodiment. Three successive times (i.e., time periods and/or instances) 602, 604, and 606 are depicted in FIG. 6. At time 602, the talkgroup 102 has an active data session on a data channel 608, which is depicted as an arrow that is directed from the base station 202 towards the talkgroup 102, while the active data session is depicted as "DATA" indicators in the data channel 608.

At time 604, the base station 202 receives (or has received) a voice-session request for the talkgroup 102, as illustrated by the arrow that is to the left of, and directed towards, the base station 202, and that is depicted just below a "VOICE SESSION REQUEST" indicator. In response to receiving the voice-session request, the base station 202 determines whether or not the talkgroup 102 currently has an active data session, which the talkgroup 102 does, on the example data channel 608. At time 606, the base station 202 accordingly establishes the requested voice session for the talkgroup 102 on the voice channel 508, and continues the active data session for the talkgroup 102 via metadata fields in the voice channel 508. The established voice session is depicted as several "VOICE" indicators on the voice channel 508, and the continued data session (also on the voice channel 508) is depicted as several "DATA" indicators. And certainly other examples could be presented.

As discussed above, the data session could terminate during the voice session. Or it could occur that the voice session terminates during the data session. In the latter case, the base station 202 may continue the data session on either the voice channel or a data channel. In an embodiment, the base station 202 extends the voice session based at least in part on the amount of remaining packet data. In another embodiment, the base station 202 decides whether to continue the data session on the voice channel or transfer it to a data channel based at least in part on the amount of remaining packet data. And certainly other possibilities could be listed.

Furthermore, it is noted that, in connection with any instance in which (i) the base station 202 is serving the talkgroup 102 in connection with a voice session on a voice channel and also in connection with a data session via metadata fields on that same voice channel, (ii) the voice session then terminates while the data session is still ongoing, and (iii) the base station 202 then continues the data session on that voice channel, the base station 202 may continue that data session on the voice channel via metadata fields on that voice channel, or may transition to using a higher-data-rate approach, perhaps similar to what the base station 202 would use on a channel designated as a data channel. And certainly other examples could be listed.

Figure 7:
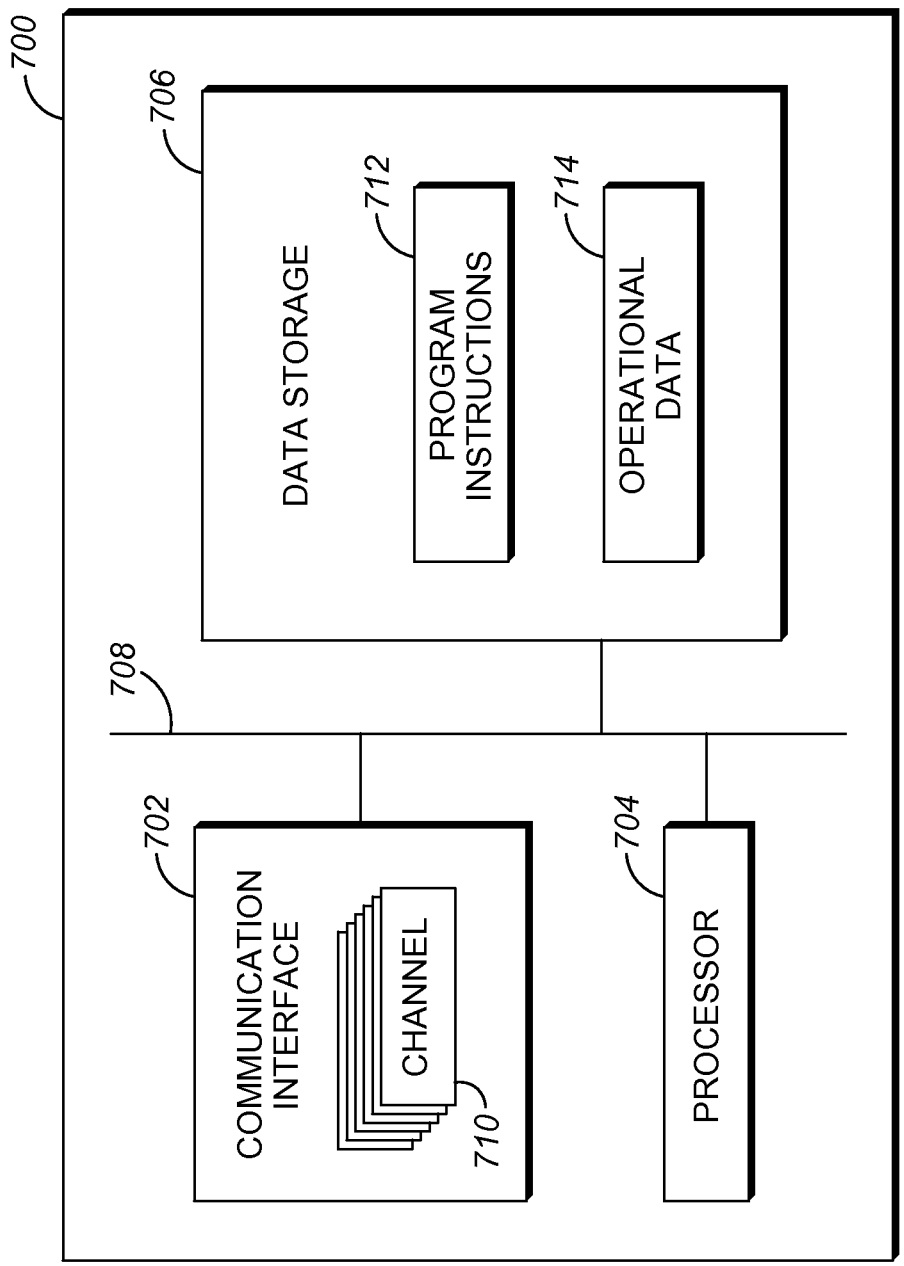
FIG. 7 depicts an example computing and communication device, in accordance with at least one embodiment.

FIG. 7 depicts an example computing and communication device, in accordance with at least one embodiment. In particular, FIG. 7 depicts an example computing and communication device (CCD) 700 as including a communication interface 702, a processor 704, and data storage 706, communicatively coupled with one another via a system bus (or other suitable connection, network, or the like) 708. As a general matter, the example CCD 700 is presented as an example system that could be programmed and configured to carry out the functions described herein. Thus, the base station 202 and/or one or more other network devices, entities, systems, and the like could, alone or taken together, have an architecture and/or structure similar to that of the example CCD 700.

The communication interface 702 may include (i) one or more wireless-communication interfaces for communicating according to one or more of the wireless-communication types and/or protocols mentioned above, and/or one or more other types and/or protocols deemed suitable by those having skill in the relevant art for a given implementation or in a given context and/or (ii) one or more wired-communication interfaces for communicating according to one or more types and/or protocols such as Ethernet, USB, and the like, and/or one or more other types and/or protocols deemed suitable by those having skill in the relevant art for a given implementation or in a given context. As such, the communication interface 702 may include any necessary hardware (e.g., chipsets, antennas, Ethernet cards, etc.), any necessary firmware, and any necessary software for conducting one or more forms of communication with one or more other entities.

Moreover, in the depicted embodiment, the communication interface 702 includes a set of channels 710, each of which could take the form of or at least include components known in the art as channel elements. As a general matter, the depiction of the communication interface 702 including the channels 710 is a graphical representation of the capability of the communication interface 702 to send and receive communications via multiple different channels. In at least one embodiment, the channels 710 include one or more voice channels and one or more data channels. One or more of the channels 710 could be P25 channels. In one embodiment, each of the channels 710 has a bandwidth of 12.5 kilohertz (kHz). The CCD 700 may be capable of allocating various channels to respective mobile radios and/or respective talkgroups for respective voice and/or data sessions. In at least one embodiment, each of the channels 710 can be allocated as either a voice or data channel at any given time. In at least one embodiment, the channels 710 includes one or more designated voice channels and one or more designated data channels. In at least one embodiment, the data channels are group data channels that are not specifically allocated to particular mobile radios or to particular talkgroups at particular times. In at least one embodiment, the data channels are specifically allocated to particular mobile radios or to particular talkgroups at particular times.

The processor 704 may include one or more processors of any type deemed suitable by those of skill in the relevant art, some examples including a general-purpose microprocessor and a dedicated digital signal processor (DSP).

The data storage 706 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 7, the data storage 706 contains program instructions 712 executable by the processor 704 for carrying out various functions, and also contains operational data 714. In an embodiment in which a computing system such as the example CCD 700 is arranged, programmed, and configured to carry out processes such as the above-described processes 300 or 400, the program instructions 712 are executable by the processor 704 for carrying out those functions; in instances where other entities described herein have a structure similar to that of the example CCD 700, the respective program instructions 712 for those respective devices are executable by their respective processors 704 to carry out functions respectively performed by those devices. And those having skill in the relevant art will appreciate that a CCD could have additional and/or different components, and perhaps a different arrangement of components, among many other possible variations that could be listed here.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A method comprising:
   handling receipt of packet data addressed to a talkgroup by responsively:
      determining whether or not the talkgroup currently has an active voice session on a voice channel;
      when the determining step determines the talk-group currently has no active voice session on the voice channel, then routing the received packet data to the talkgroup on a data channel and continuing a transfer of the packet data to the talkgroup on the voice channel responsive to detecting an early termination of the transfer of the packet data to the talkgroup on the data channel; and
      when the determining step determines the talkgroup currently has the active voice session on the voice channel, then routing the received packet data to the talkgroup via metadata fields in the voice channel.

2. The method of claim 1, wherein the talkgroup has the active voice session on a given voice channel while the given voice channel is allocated to the talkgroup for the active voice session.

3. The method of claim 1, wherein the talkgroup has the active voice session on a given voice channel when one or more of the following is true: (i) audio data is being transmitted on the given voice channel in connection with the active voice session, (ii) signaling data is being transmitted on the given voice channel in connection with the active voice session, and (iii) the active voice session is in a hang-time state.

4. The method of claim 1, further comprising completing a transfer of the packet data via the metadata fields in the voice channel during the active voice session.

5. The method of claim 1, further comprising continuing a transfer of the packet data on the voice channel subsequent to detecting a termination of the active voice session.

6. The method of claim 1, further comprising continuing a transfer of the packet data on a data channel responsive to detecting a termination of the active voice session.

7. The method of claim 1, carried out in response to determining that the packet data consists of less than a threshold amount of packet data.

8. The method of claim 1, wherein the data channel is from group data channels that are not specifically allocated to particular talkgroups at particular times.

9. The method of claim 1, wherein the data channel is specifically allocated to particular talkgroups at particular times.

10. The method of claim 1, wherein the metadata fields are link-control (LC) fields.

11. The method of claim 1, wherein the metadata fields are Media Access Control (MAC) layer fields.

12. The method of claim 1, further comprising:
   handling receipt of a requested voice-session for the talkgroup by responsively:
      determining whether or not the talkgroup currently has an active data session on a data channel;
      when the determining step determines the talk-group currently has no active data session on the data channel, then establishing the requested voice session on a voice channel; and
      when the determining step determines the talkgroup currently has no active data session on the data channel, then (i) establishing the requested voice session on a voice channel and (ii) continuing the active data session via metadata fields in the voice channel on which the requested voice session was established.

13. The method of claim 12, wherein the talkgroup has the active data session on a given data channel while the given data channel is allocated to the talkgroup for the active data session.

14. The method of claim 12, wherein the talkgroup has the active data session on a given data channel when one or more of the following is true: (i) bearer data is being transmitted on the given data channel in connection with the active data session, (ii) signaling data is being transmitted on the given data channel in connection with the active data session, and (iii) the active data session is in a not-timed-out state.

15. The method of claim 12, wherein the active data session is completed via metadata fields in the voice channel on which the requested voice session was established during the requested voice session.

16. The method of claim 12, further comprising continuing the active data session on the voice channel on which the requested voice session was established subsequent to detecting a termination of the active voice session.

17. The method of claim 12, further comprising continuing the active data session on a data channel responsive to detecting a termination of the active voice session.

18. A system comprising:
a communication interface;
a processor; and
data storage containing instructions executable by the processor for causing the system to carry out a set of functions, the set of functions including:
handling receipt of packet data addressed to a talkgroup by responsively:
determining whether or not the talkgroup currently has an active voice session on a voice channel;
when the determining step determines the talkgroup currently has no active voice session on the voice channel, then routing the received packet data to the talkgroup on a data channel and continuing a transfer of the packet data to the talkgroup on the voice channel responsive to detecting an early termination of the transfer of the packet data to the talkgroup on the data channel; and
when the determining step determines the talkgroup currently has the active voice session on the voice channel, then routing the received packet data to the talkgroup via metadata fields in the voice channel.

19. The system of claim 18, wherein the set of functions further includes:
handling receipt of a requested voice-session for the talkgroup by responsively:
determining whether or not the talkgroup currently has an active data session on a data channel;
when the determining step determines the talkgroup currently has no active data session on the data channel, then establishing the requested voice session on a voice channel; and
when the determining step determines the talkgroup currently has the active data session on the data channel, then (i) establishing the requested voice session on a voice channel and (ii) continuing the active data session via metadata fields in the voice channel on which the requested voice session was established.

\* \* \* \* \*